US009834730B2

(12) United States Patent
Chengara et al.

(10) Patent No.: US 9,834,730 B2
(45) Date of Patent: Dec. 5, 2017

(54) USE OF EMULSION POLYMERS TO FLOCCULATE SOLIDS IN ORGANIC LIQUIDS

(71) Applicant: Ecolab USA Inc., Naperville, IL (US)

(72) Inventors: Anoop Chengara, Hoffman Estates, IL (US); Jordan Montag, Sugar Land, TX (US)

(73) Assignee: ECOLAB USA INC., Naperville, IL (US)

( * ) Notice: Subject to any disclaimer, the term of this patent is extended or adjusted under 35 U.S.C. 154(b) by 415 days.

(21) Appl. No.: 14/162,171

(22) Filed: Jan. 23, 2014

(65) Prior Publication Data

US 2015/0203764 A1    Jul. 23, 2015

(51) Int. Cl.
*C10G 29/20* (2006.01)
*C10G 31/00* (2006.01)
*B01J 8/00* (2006.01)
*C10G 29/00* (2006.01)
*C10G 29/02* (2006.01)
*C10G 21/20* (2006.01)
*C10G 21/06* (2006.01)

(52) U.S. Cl.
CPC ............... *C10G 29/20* (2013.01); *B01J 8/00* (2013.01); *B01J 8/005* (2013.01); *C10G 21/20* (2013.01); *C10G 29/00* (2013.01); *C10G 29/02* (2013.01); *C10G 31/00* (2013.01); *C10G 21/06* (2013.01)

(58) Field of Classification Search
CPC ......... C10G 29/00; C10G 29/02; C10G 31/00
See application file for complete search history.

(56) References Cited

U.S. PATENT DOCUMENTS

| 2,178,139 A | 10/1939 | Epstein et al. |
| 2,202,601 A | 5/1940 | Ried |
| 3,152,872 A | 10/1964 | Scoggin et al. |
| 3,259,570 A * | 7/1966 | Priesing ............... C02F 1/54 210/727 |

(Continued)

FOREIGN PATENT DOCUMENTS

| CA | 1331572 | 8/1994 |
| CA | 2694811 A1 | 9/2011 |

(Continued)

OTHER PUBLICATIONS

Sztukowski, D., et al., Oilfield Solids and Water-in-oil Emulsion Stability, 2005, Journal of Colloid and Interface Science, vol. 285, pp. 821-833.*

(Continued)

*Primary Examiner* — Renee Robinson
*Assistant Examiner* — Derek Mueller
(74) *Attorney, Agent, or Firm* — Eric D. Babych; Brinks Gilson & Lione

(57) ABSTRACT

Methods and compositions for flocculating solids are provided. The solids may be suspended in an organic liquid medium and a water in oil emulsion may be added to the liquid medium. The water in oil emulsion includes an emulsion polymer capable of flocculating the solids suspended in the organic liquid medium. The emulsion polymer may be added to the organic liquid medium in an inactive form and the polymer may subsequently become activated upon contacting the organic liquid medium. Once activated, the polymer may flocculate the suspended solids.

17 Claims, 1 Drawing Sheet

(56) References Cited

U.S. PATENT DOCUMENTS

| | | | |
|---|---|---|---|
| 3,661,774 A | 5/1972 | Masologites | |
| 3,793,299 A | 2/1974 | Zimmerer | |
| 4,159,240 A | 6/1979 | Malek | |
| 4,383,927 A * | 5/1983 | Srivatsa | B01D 17/00 210/708 |
| 4,385,961 A | 5/1983 | Svending et al. | |
| 4,388,150 A | 6/1983 | Sunden et al. | |
| 4,692,237 A * | 9/1987 | Hsu | C10G 1/002 208/177 |
| 4,719,008 A | 1/1988 | Sparks et al. | |
| 4,727,110 A * | 2/1988 | Fan | C08F 2/32 524/801 |
| 4,753,710 A | 6/1988 | Langley et al. | |
| 4,783,314 A | 11/1988 | Hoots et al. | |
| 4,913,775 A | 4/1990 | Langley et al. | |
| 4,966,652 A | 10/1990 | Wasser | |
| 4,992,380 A | 2/1991 | Moriarty et al. | |
| 5,098,520 A | 3/1992 | Begala | |
| 5,137,641 A * | 8/1992 | Bhattacharyya | C02F 1/54 210/733 |
| 5,167,776 A | 12/1992 | Bhaskar et al. | |
| 5,171,450 A | 12/1992 | Hoots | |
| 5,182,062 A | 1/1993 | Lee et al. | |
| 5,254,221 A | 10/1993 | Lowry et al. | |
| 5,274,055 A | 12/1993 | Honig et al. | |
| 5,286,386 A | 2/1994 | Darian et al. | |
| 5,346,589 A | 9/1994 | Braunstein et al. | |
| 5,840,158 A | 11/1998 | Choo et al. | |
| 6,071,379 A | 6/2000 | Wong Shing et al. | |
| 6,361,652 B2 | 3/2002 | Keiser et al. | |
| 6,361,653 B2 | 3/2002 | Keiser et al. | |
| 6,372,805 B1 | 4/2002 | Keiser et al. | |
| 6,379,753 B1 | 4/2002 | Soane et al. | |
| 6,486,216 B1 | 11/2002 | Keiser et al. | |
| 6,592,718 B1 | 7/2003 | Wong Shing et al. | |
| 6,605,674 B1 | 8/2003 | Whipple et al. | |
| 7,125,469 B2 | 10/2006 | Barcus et al. | |
| 7,473,334 B2 | 1/2009 | Wong Shing et al. | |
| 7,497,924 B2 | 3/2009 | Nguyen et al. | |
| 7,615,135 B2 | 11/2009 | Harrington et al. | |
| 7,641,776 B2 | 1/2010 | Nagar et al. | |
| 7,829,738 B1 | 11/2010 | Brammer, Jr. et al. | |
| 7,995,504 B2 | 8/2011 | Ransom et al. | |
| 8,012,758 B2 | 9/2011 | Enzien et al. | |
| 8,021,518 B2 | 9/2011 | Furman et al. | |
| 8,066,847 B2 | 11/2011 | Grigoriev et al. | |
| 8,067,629 B2 | 11/2011 | Tong | |
| 8,071,667 B2 | 12/2011 | Furman, Jr. et al. | |
| 8,082,649 B2 | 12/2011 | Rider | |
| 8,088,213 B2 | 1/2012 | Cheng et al. | |
| 8,092,618 B2 | 1/2012 | Sharpe et al. | |
| 8,092,649 B2 | 1/2012 | Shevchenko et al. | |
| 8,097,687 B2 | 1/2012 | Kurian et al. | |
| 8,101,045 B2 | 1/2012 | Furman et al. | |
| 8,123,042 B2 | 2/2012 | Tran | |
| 8,172,983 B2 | 5/2012 | Cheng et al. | |
| 8,242,287 B2 | 8/2012 | Schertzer et al. | |
| 8,246,780 B2 | 8/2012 | Duggirala et al. | |
| 8,247,593 B2 | 8/2012 | Morrison et al. | |
| 8,247,597 B2 | 8/2012 | Fair et al. | |
| 8,258,208 B2 | 9/2012 | Kurian et al. | |
| 8,262,852 B2 | 9/2012 | Duggirala et al. | |
| 8,262,858 B2 | 9/2012 | Duggirala et al. | |
| 8,288,835 B2 | 10/2012 | Quevy et al. | |
| 8,298,439 B2 | 10/2012 | Blubaugh et al. | |
| 8,298,508 B2 | 10/2012 | Wang et al. | |
| 8,302,778 B2 | 11/2012 | Tran | |
| 8,366,877 B2 | 2/2013 | Duggirala et al. | |
| 8,382,947 B2 | 2/2013 | Skaggs et al. | |
| 8,382,950 B2 | 2/2013 | Cheng | |
| 8,398,901 B2 | 3/2013 | Beck et al. | |
| 8,414,739 B2 | 4/2013 | Kimura et al. | |
| 8,440,052 B2 | 5/2013 | Duggirala et al. | |
| 8,444,812 B2 | 5/2013 | Grigoriev et al. | |
| 8,465,623 B2 | 6/2013 | Zhao et al. | |
| 2005/0025659 A1 | 2/2005 | Godfrey et al. | |
| 2006/0196812 A1 * | 9/2006 | Beetge | C10G 1/045 208/435 |
| 2008/0156700 A1 | 7/2008 | Abulnaga et al. | |
| 2009/0127205 A1 | 5/2009 | Sikes et al. | |
| 2010/0101981 A1 | 4/2010 | Moffett et al. | |
| 2011/0017676 A1 | 1/2011 | Franks et al. | |
| 2011/0073528 A1 | 3/2011 | Osaheni et al. | |
| 2011/0182990 A1 | 7/2011 | Su et al. | |
| 2011/0196094 A1 | 8/2011 | Hamad et al. | |
| 2011/0250341 A1 | 10/2011 | Keiser et al. | |
| 2011/0253599 A1 | 10/2011 | Cross et al. | |
| 2011/0277947 A1 | 11/2011 | Hua et al. | |
| 2011/0293932 A1 | 12/2011 | Jiang et al. | |
| 2012/0205065 A1 | 8/2012 | Esser | |
| 2013/0139856 A1 | 6/2013 | Vinson et al. | |
| 2013/0146099 A1 | 6/2013 | Monsrud et al. | |
| 2013/0146102 A1 | 6/2013 | Monsrud et al. | |
| 2013/0146425 A1 | 6/2013 | Tokhtuev | |
| 2014/0083416 A1 | 3/2014 | Nuopponen et al. | |
| 2014/0166537 A1 | 6/2014 | Kremer et al. | |

FOREIGN PATENT DOCUMENTS

| | | |
|---|---|---|
| CN | 1820862 | 8/2006 |
| CN | 103772604 | 5/2014 |
| CN | 103772605 | 5/2014 |
| DE | 2812865 A1 | 10/1978 |
| DE | 3017876 A1 | 5/1982 |
| DE | 3541465 A1 | 8/1986 |
| EP | 87965 A2 | 9/1983 |
| EP | 281977 A1 | 9/1988 |
| EP | 510580 A1 | 10/1992 |
| EP | 1538257 A1 | 6/2005 |
| FR | 2802827 A1 | 6/2001 |
| GB | 2006728 | 5/1979 |
| JP | 52080283 | 7/1977 |
| JP | 58149943 | 9/1983 |
| JP | 58164688 | 9/1983 |
| JP | 09187638 | 7/1997 |
| NL | 103768 | 2/1963 |
| WO | WO 9731693 A1 | 9/1997 |
| WO | WO 0071609 A1 | 11/2000 |
| WO | WO 02102938 A1 | 12/2002 |
| WO | WO 03020791 A1 | 3/2003 |
| WO | WO 2010/124378 A1 | 11/2010 |
| WO | WO 2010/125247 A2 | 11/2010 |
| WO | WO 2010/131016 A2 | 11/2010 |
| WO | WO 2010/134868 A1 | 11/2010 |
| WO | WO 2012/034997 A1 | 3/2012 |
| WO | WO 2012/098296 A2 | 7/2012 |
| WO | WO 2013044346 A1 | 4/2013 |
| WO | WO 2013048622 A1 | 4/2013 |
| WO | WO 2013172716 A1 | 11/2013 |

OTHER PUBLICATIONS

International Search Report dated Apr. 28, 2015 for PCT/US2015/011636.
Tyagi et al. *Bulletin of Materials Science* (2009), 32(6), 583-587.
International Search Report and Written Opinion for PCT/US2014/049614, dated Nov. 18, 2014, 7 pages.

* cited by examiner

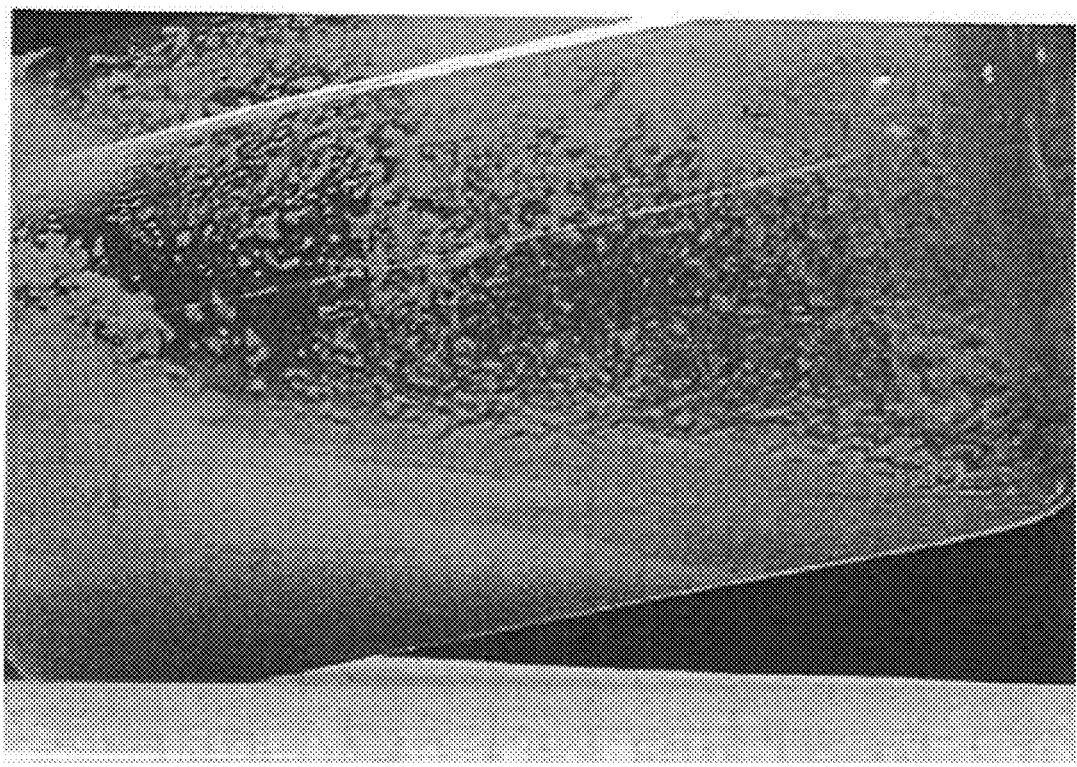

USE OF EMULSION POLYMERS TO FLOCCULATE SOLIDS IN ORGANIC LIQUIDS

BACKGROUND

1. Field of the Invention

The present disclosure generally relates to flocculants and methods for flocculating suspended solids. More particularly, the disclosure relates to water in oil emulsions comprising polymeric flocculants and addition of such emulsions to liquids comprising suspended solids.

2. Description of the Related Art

The earth contains deposits of crude oil and bituminous sands, known as tar sands or oil sands. If these deposits are located sufficiently close to the earth's surface, they can be recovered using surface or strip mining techniques. The mined ore typically contains about 10-15% bitumen, 80-85% mineral matter, with the balance being water, and requires separation of the valued bitumen product from the mineral matter.

Separation may be accomplished by initially mixing or slurrying the ore with warm water in a hydrotransport line beginning the bitumen liberation process. The resultant slurry may then be fed to a primary separation vessel or cell. In this process, additional warm water is added and the majority of the liberated bitumen will become attached to air bubbles where it is recovered by flotation. The bitumen liberation and recovery process generally occurs at a pH of about 8.5, which is generally obtained with the assistance of caustic soda. The coarse mineral matter is removed from the bottom of the vessel and a middlings portion, containing water, fine mineral matter and suspended bitumen is sent for further bitumen recovery.

Bitumen may also be diluted with a paraffinic solvent or a naphthenic solvent to aid in the removal of water and mineral matter (clay). Additionally, demulsifiers may be used to enhance the removal of water droplets and solid minerals contained in the water droplets. However, there are completely hydrophobic minerals (generally clay particles that are partially or completely covered by organic components) that cannot be removed by removing the water alone. To remove such minerals, chemical additives have been employed to alter the wettability of the particles from oil-wetted to water-wetted. These techniques have been found to be of limited utility and won't work at all unless there is a bulk water phase present.

Additionally, flocculation techniques may be employed to remove clay minerals. Typically, flocculation of solid particles dispersed in water is accomplished by the use of polymers bearing the opposite charge. However, in low dielectric media, such as aliphatic or aromatic liquids, the particles do not have a strong surface charge and charged polymers having a high molecular weight cannot be dispersed.

High molecular weight (e.g. greater than about 1,000,000 Da) charged polymers are commonly manufactured by polymerizing water soluble monomers that have been dispersed in an oil solvent in the form of a fine emulsion. This causes the polymers to become highly coiled inside the emulsion droplets. To activate the polymers (i.e. uncoil the polymer chains and extend them to expose the charged species), the emulsion is dispersed in very dilute concentrations (typically 0.5% to 2.0% wt.) in water. This dilute polymer solution is then mixed with an aqueous slurry of solids to be flocculated, whereby bridging flocculation occurs due to anchoring of the polymer chains onto the oppositely charged particle surface.

BRIEF SUMMARY

The present application discloses compositions and methods useful for flocculating suspended solids. In one aspect, a flocculation method is provided comprising the steps of providing an organic solvent comprising suspended solids and adding to the organic solvent a water in oil emulsion comprising an emulsion polymer. The water in oil emulsion is added, before activation or inversion, directly into the organic solvent. The method further comprises the steps of releasing the emulsion polymer into the organic solvent, allowing the emulsion polymer to attach to the suspended solids, and flocculating the suspended solids.

In an additional aspect, a method is provided for flocculating suspended solids in diluted bitumen comprising the step of diluting a sample of bitumen in an organic solvent to form diluted bitumen, wherein the diluted bitumen further comprises suspended hydrophobic solids. The method also comprises the steps of dispersing an inactive, water soluble polymer in a hydrocarbon liquid to form a water in oil emulsion comprising the inactive polymer, adding the water in oil emulsion to the diluted bitumen, activating the inactive polymer, allowing the polymer to attach to the suspended hydrophobic solids, and flocculating the suspended hydrophobic solids.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows a picture of solids flocculated as a result of the addition of an embodiment of the presently disclosed emulsion polymer thereto.

DETAILED DESCRIPTION

Various embodiments are described below. The relationship and functioning of the various elements of the embodiments may better be understood by reference to the following detailed description. However, embodiments are not limited to those described below. It should be understood that in certain instances, details may have been omitted that are not necessary for an understanding of embodiments disclosed herein.

The present disclosure relates to the use of emulsion polymers in flocculation methods. In some aspects, the methods relate to flocculating solids, such as hydrophobic solids, in organic solvents. Flocculation may be accomplished by adding a water in oil emulsion comprising the polymer directly into the organic solvent containing the solids. In accordance with the present disclosure, it is to be understood that adding the water in oil emulsion comprising the emulsion polymer "directly" into the organic solvent means that the emulsion is added without (or before) first "inverting" or "activating" the emulsion in water. The present disclosure, therefore, does not rely on activating the emulsion polymer in its traditional form.

Instead, this disclosure contemplates the direct injection of the water in oil emulsion comprising the polymer (in its highly coiled and inactive form) into a dispersion of solids in a solvent. Due to the high degree of dilution, the surfactants that stabilize the emulsion polymer droplets are stripped away and the polymer chains are released and exposed to the suspended solids.

Without wishing to be bound by any theories, it is considered that the polymer chains adsorb onto the solid particle surface most likely due to entropic effects (as opposed to electrostatic interaction) and bridge the particles. When the presently disclosed emulsion polymers are water soluble emulsion polymers, they quickly return to a coiled state when they are exposed to an organic solvent, which thereby brings the particles together. Such a process is similar to a sweep floc mechanism that has been observed in aqueous dispersions, e.g. the use of acid colloids, such as melamine formaldehyde resins, to flocculate fine paint dispersions in water, or the use of aluminum or ferric salts to form insoluble hydroxides in water and remove fine particles by trapping them in an insoluble matrix.

The emulsion polymers that may be used in accordance with the present disclosure are not limited to any specific type of polymer. In some aspects, the emulsion polymer is water soluble. In this aspect, the water droplets dispersed in the oil contain the polymer. Moreover, any reference in the present disclosure to "an emulsion polymer," "the emulsion polymer," "a polymer," or "the polymer" should be understood to be referring to either a single polymer or multiple polymers. Thus, "an emulsion polymer" or "a polymer" may comprise one polymer, two polymers, three polymers, four polymers, five polymers, or any other number of polymers. The terms polymer and emulsion polymer are used interchangeably herein.

The emulsion polymer may be cationic, anionic, non-ionic, amphoteric, or any combination thereof. Thus, in one aspect, the emulsion polymer may comprise a cationic polymer. In another aspect, the emulsion polymer may comprise an anionic polymer. In a further aspect, the emulsion polymer may comprise a cationic polymer and a non-ionic polymer. Again, the emulsion polymer may comprise any combination of cationic, anionic, amphoteric, and non-ionic polymers.

In certain aspects, the emulsion polymer is a high molecular weight emulsion polymer. A high molecular weight emulsion polymer may be a polymer having a molecular weight in excess of about 1,000,000 Daltons (Da). For example, in some aspects, the emulsion polymer may have a molecular weight between about 1,000,000 Da and about 20,000,000 Da. In other aspects, the emulsion polymer may have a molecular weight from about 5,000,000 Da to about 20,000,000 Da or from about 10,000,000 Da to about 20,000,000 Da.

While any polymer that meets the criteria outlined in the present specification may be used in accordance with the present flocculation methods, illustrative, non-limiting examples of emulsion polymers are selected from the group consisting of polyacrylamide, a polymer, copolymer, or terpolymer comprising acrylamide, a polymer comprising diallyl dimethyl ammonium chloride, a polymer comprising acrylamide and diallyl dimethyl ammonium chloride, and any combination thereof.

For example, the polymer may be a copolymer comprising acrylamide and any cationic monomer selected from the group consisting of dimethylaminoethyl acrylate methyl chloride quaternary salt (DMAEA.MCQ), dimethylaminoethyl acrylate benzyl chloride quaternary salt (DMAEA.BCQ), dimethylaminoethyl acrylate methyl sulfate quaternary salt (DMAEA.MSQ), dimethylaminoethyl methacrylate methyl chloride quaternary salt (DMAEM.MCQ), dimethylaminoethyl methacrylate benzyl chloride quaternary salt (DMAEM.BCQ), acrylamidopropyl trimethyl ammonium chloride (APTAC), and methylacrylamidopropyl trimethyl ammonium chloride (MAPTAC).

Again, the presently disclosed emulsion polymer may comprise a single copolymer selected from any polymer falling under the general definitions set forth in the present application or it may comprise two or more polymers falling under the general definitions set forth in the present application. For example, in one aspect, the polymer may comprise polyacrylamide and in another aspect, the polymer may comprise a copolymer of acrylamide and diallyl dimethyl ammonium chloride.

Illustrative, non-limiting examples of anionic polymers include copolymers of acrylamide and sodium acrylate, acrylamide and ammonium acrylate, and/or acrylamide and sodium acrylamido methyl propane sulfonate (NaAMPS).

Illustrative, non-limiting examples of amphoteric polymers include acrylamide combined with a cationic monomer, such as any cationic monomer set forth in the present application, and an anionic monomer, such as any anionic described in the present application.

An illustrative, non-limiting example of a nonionic polymer that may be used in accordance with the present disclosure is polydimethylaminopropyl methacrylamide (DMAPMA).

Any polymer or combination of polymers disclosed herein may be in the form of a dispersion in a solvent. The solvent may be a hydrocarbon solvent, such as a paraffin solvent, mineral oil, etc. The monomer(s) used to synthesize the polymer may be dissolved in water and subsequently, the dissolved monomer(s) may be dispersed in a solvent, such as a hydrocarbon solvent, using one or more surfactants. Then, the monomer(s) may be converted to polymer chains using either temperature activated initiators or redox initiators. During the process, the polymer chains remain confined inside the water droplets that are dispersed in the oil.

Thus, in accordance with any aspect of the present disclosure, a water in oil emulsion may comprise the emulsion polymer. In accordance with the flocculation methods disclosed herein, the emulsion comprising the polymer does not need to be inverted or activated before addition to the liquid, such as an organic solvent, containing the solids. The water of the water in oil emulsion comprises the polymer in a highly coiled, inactive form. The term "inactive" is intended to mean that the polymer cannot perform its intended function, which may be flocculating solids. When added into a liquid, such as an organic solvent comprising hydrophobic solids, the surfactants that stabilized the emulsion polymer droplets are stripped away and the polymer chains are "activated" (i.e. released and exposed to the suspended solids). Once released and exposed to the solids, the polymer attaches or adsorbs to the solid particles and then returns to a coiled configuration, thereby flocculating the solids.

Although it is noted that activating the polymer chains is accomplished by adding them into the organic solvent, this "activating" should not be confused with the standard definition of "activating," which is understood to mean the uncoiling and extension of these water soluble polymers in water to their optimum configuration. In accordance with the present disclosure, the release of the water soluble polymer into the diluted bitumen (or into any organic solvent) is followed very quickly by its retraction to a coiled state since it is not energetically favorable for the polymer chains to be exposed to the organic solvent or the hydrocarbon solvent.

The stabilizing surfactants typically used in the process are Span® 80 (CAS No. 1338-43-8) and Tween® 61 (CAS No. 9005-67-8) and the activating surfactant typically used is selected from a $C_{12}$-$C_{14}$ alcohol with 7 moles of ethylene oxide, although the disclosure is not limited to these exemplary surfactants.

The amount of polymer to be added to the liquid containing the solids to be flocculated depends on the concentration of solids in the liquid. Moreover, the amount of polymer may also depend upon the size distribution of the solids in the liquid. For example, a lower concentration of solids may require a lower polymer dosage. In some aspects, the range at which the presently disclosed polymer may be dosed can be between about 0.05 wt. % and about 20 wt. %, based on the mass of the solids to be flocculated. In certain aspects, the range at which the presently disclosed polymer may be dosed can be between about 0.5 wt. % and about 10 wt. % based on the mass of the solids to be flocculated. In other aspects, the dosage may be between about 0.5 wt. % and about 5 wt. % and in other aspects, the dosage may be between about 2 wt. % and about 4 wt. % based on the mass of the solids to be flocculated.

In other aspects, from about 1,000 ppm to about 3,000 ppm (based on the volume of the slurry containing the solids to be flocculated) of active polymer may be used in accordance with the presently disclosed flocculation methods. In other aspects, from about 1,700 ppm to 2,100 ppm of active polymer may be used. The amount can vary depending on the type of polymer used and the volume of liquid used. If 5,000 ppm of emulsion polymer, based on organic liquid volume, is used, this would correspond to between about 1,700 ppm and about 2,100 ppm of active polymer, depending on the type of polymer, since the active polymer concentration ranges from about 30 wt. % to about 42 wt. %.

The types of solids that can be flocculated in accordance with the present disclosure are not limited. In some aspects, the solids are hydrophobic solid particles. In some aspects, the solids comprise minerals, such as clay and/or clay covered by various organic components. The solids to be flocculated may also be those solids conventionally found in industrial wastewaters, mining applications, and pulp and papermaking applications.

The flocculation methods and polymers disclosed herein may be used to improve fine mineral (such as clay) removal from diluted bitumen. In some aspects, bitumen may be diluted with aromatic naphtha solvents. In other aspects, the bitumen may be diluted with an aliphatic solvent, such as pentane or hexane. The methods and polymers can be used in, for example, the naphthenic froth treatment process or in the paraffinic froth treatment process, both of which processes, without the addition of the presently disclosed flocculation methods and polymers, are commonly known in the art.

While the present flocculation methods are useful when flocculating an organic solvent suspension containing solids, the flocculation methods are also useful when no charge interaction is possible and when no wetting agent can be used due to absence of a polar solvent, such as water. The flocculation methods and polymers may be used in, for example, emulsion breaking applications in oil field chemicals, fine solids removal from oil, separation of catalyst fines in refinery and fuel management, and solids removal in an oilsands solvent extraction process.

EXAMPLES

Two different polymers were tested in accordance with the methods disclosed in the present application. Polymer A was a copolymer of acrylamide and diallyl dimethyl ammonium chloride. Polymer B was polyacrylamide. Polymers A and B are manufactured as inverse emulsions in a paraffinic solvent and were used in these examples as manufactured, without any further dilution or dispersion. The hydrophobic solids tested were Cloisite® 20A or Cloisite® 30B, which are available from Southern Clay Products, Gonzales, Tex. These products comprise clay particles modified with alkyl quaternary ammonium salt with $d_{10}<2$ μm, $d_{50}<6$ μm, and $d_{90}<13$ μm. Solids were also used that were isolated from oilsands bitumen froth by Dean Stark extraction and sieved to below 45 μm. The solvents used to dilute/suspend the aforementioned solids were selected from (1) toluene and (2) a 1:1 (w/w) mixture of pentane and hexane.

Five samples were prepared for testing as follows:
Sample 1: comprising about 9 grams of 1:1 w/w pentane-hexane and about 1.0 gram of Cloisite 20A solids;
Sample 2: comprising about 9.5 grams of toluene and about 0.5 gram of Cloisite 30B solids;
Sample 3: comprising about 9.5 grams of the solvent having a 1:1 (w/w) mixture of pentane and hexane and about 0.5 grams of solids;
Sample 4: comprising about 9.5 grams of the solvent having a 1:1 (w/w) mixture of pentane and hexane and about 1 gram of sub 44 micron solids isolated from bitumen froth.

50 microliters of either Polymer A or Polymer B was added to each of the Samples 1-5 at the time of the test.

All samples were shaken to fully disperse the solids in the solvent before Polymer A or Polymer B was added thereto. After addition of Polymer A or Polymer B, the samples were once again shaken. Flocculation of the solid particles was observed within seconds, as is evidenced by FIG. 1. FIG. 1 relates to the use of Polymer A, the 1:1 w/w hexane and pentane mixture solvent, and the solid was Cloisite 20A.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A flocculation method comprising:
   providing an organic solvent comprising suspended solids;
   adding to the organic solvent a water in oil emulsion comprising an emulsion polymer, wherein the water in oil emulsion is added, before activation or inversion, directly into the organic solvent, wherein the emulsion polymer is selected from the group consisting of polydimethylaminopropyl methacrylamide, a copolymer comprising acrylamide and dimethylaminoethyl acrylate methyl chloride quaternary salt, a copolymer comprising acrylamide and dimethylaminoethyl acrylate methyl sulfate quaternary salt, a copolymer comprising acrylamide and acrylamidopropyl trimethyl ammonium chloride (APTAC), a copolymer comprising acrylamide and methylacrylamidopropyl trimethyl ammonium chloride, a copolymer comprising acrylamide and sodium acrylamido methyl propane sulfonate, and any combination thereof;
   releasing the emulsion polymer into the organic solvent;
   allowing the emulsion polymer to attach to the suspended solids; and
   flocculating the suspended solids.

2. The method of claim 1, wherein the emulsion polymer is water soluble.

3. The method of claim 1, wherein the emulsion polymer comprises a molecular weight of greater than about 1,000,000 Daltons.

4. The method of claim 1, wherein the emulsion polymer is stabilized by one or more surfactants.

5. The method of claim 1, wherein the suspended solids comprise hydrophobic particles.

6. The method of claim 1, wherein the organic solvent is an aromatic naphtha or an aliphatic solvent.

7. The method of claim 6, wherein the aliphatic solvent is selected from the group consisting of pentane, hexane, and any combination thereof.

8. The method of claim 1, wherein the method is included in a naphthenic froth treatment process or a paraffinic froth treatment process.

9. The method of claim 1, wherein the water in oil emulsion comprises the emulsion polymer in an inactive form when the water in oil emulsion is added into the organic solvent.

10. The method of claim 1, wherein the water of the water in oil emulsion comprises the emulsion polymer.

11. The method of claim 1, wherein the emulsion polymer is added to the organic solvent in an amount between about 0.05% and about 20% by weight of the suspended solids.

12. A method for flocculating suspended solids in diluted bitumen comprising:
    diluting a sample of bitumen in an organic solvent to form diluted bitumen, wherein the diluted bitumen further comprises suspended hydrophobic solids;
    adding a water in oil emulsion comprising an emulsion polymer to the diluted bitumen, wherein the emulsion polymer is selected from the group consisting of polydimethylaminopropyl methacrylamide, a copolymer comprising acrylamide and dimethylaminoethyl acrylate methyl chloride quaternary salt, a copolymer comprising acrylamide and dimethylaminoethyl acrylate methyl sulfate quaternary salt, and any combination thereof, wherein the water in oil emulsion is added, before activation or inversion, directly into the diluted bitumen;
    releasing the emulsion polymer into the diluted bitumen;
    allowing the emulsion polymer to attach to the suspended hydrophobic solids; and
    flocculating the suspended hydrophobic solids.

13. The method of claim 12, wherein the water in oil emulsion comprises a hydrocarbon liquid.

14. The method of claim 12, wherein the emulsion polymer is stabilized with one or more surfactants.

15. The method of claim 12, wherein the organic solvent is an aromatic naphtha or an aliphatic solvent.

16. The method of claim 12, wherein the emulsion polymer is added to the diluted bitumen in an amount between about 0.05% and about 20% by weight of the suspended solids.

17. A method of flocculating suspended solids in an organic solvent comprising:
    adding to the organic solvent a water in oil emulsion comprising an emulsion polymer, wherein the water in oil emulsion is added, before activation or inversion, directly into the organic solvent, wherein the emulsion polymer is a copolymer of acrylamide and polydimethylaminopropyl methacrylamide;
    releasing the emulsion polymer into the organic solvent;
    allowing the emulsion polymer to attach to the suspended solids; and
    flocculating the suspended solids.

* * * * *